(12) United States Patent
Romain et al.

(10) Patent No.: US 8,775,697 B2
(45) Date of Patent: Jul. 8, 2014

(54) VERIFICATION OF DATA READ IN MEMORY

(75) Inventors: Fabrice Romain, Rians (FR);
Jean-Louis Modave, Ottignies (BE)

(73) Assignees: Proton World International N.V., Zaventem (BE); STMicroelectronics S.A., Montrouge (FR)

(*) Notice: Subject to any disclaimer, the term of this patent is extended or adjusted under 35 U.S.C. 154(b) by 206 days.

(21) Appl. No.: 12/743,684

(22) PCT Filed: Oct. 18, 2008

(86) PCT No.: PCT/FR2008/052073
§ 371 (c)(1),
(2), (4) Date: Sep. 2, 2010

(87) PCT Pub. No.: WO2009/071791
PCT Pub. Date: Jun. 11, 2009

(65) Prior Publication Data
US 2010/0325320 A1    Dec. 23, 2010

(30) Foreign Application Priority Data
Nov. 19, 2007   (FR) .................................. 07 59136

(51) Int. Cl.
*G06F 3/00* (2006.01)
*G06F 5/00* (2006.01)
(52) U.S. Cl.
USPC .................................. 710/52; 710/15; 710/36

(58) Field of Classification Search
USPC ................................................ 710/52, 36, 15
See application file for complete search history.

(56) References Cited

U.S. PATENT DOCUMENTS

| | | | |
|---|---|---|---|
| 6,259,639 B1* | 7/2001 | Hashizume | 365/201 |
| 2003/0204696 A1 | 10/2003 | Yi | |
| 2004/0213069 A1* | 10/2004 | Chen | 365/227 |
| 2006/0227795 A1* | 10/2006 | Bande et al. | 370/412 |
| 2007/0174622 A1 | 7/2007 | Romain et al. | |

OTHER PUBLICATIONS

International Search Report dated Jul. 22, 2009 from corresponding International Application No. PCT/FR2008/052073.
Hagai Bar-El E Al.: *The Sorcerer's Apprentice Guide to Fault Attacks*, Internet Citation, [online] XP002329915, Extrait de l'Internet: URL: http://web.archive.org/web/20041016071838/eprint.iacr.org/2004/100> May 27, 2005.

* cited by examiner

*Primary Examiner* — Zachary K Huson
(74) *Attorney, Agent, or Firm* — Wolf, Greenfield & Sacks, P.C.

(57) ABSTRACT

A method and a circuit for checking data transferred between a circuit and a processing unit, in which: the data originating from the circuit transit through a first buffer element having a size which is a multiple of the size of data to be subsequently delivered over a bus of the processing unit; an address provided by the processing unit for the circuit is temporarily stored in a second element; and the content of the first element is compared with current data originating from the circuit, at least when they correspond to an address of data already present in this first element.

20 Claims, 3 Drawing Sheets

VERIFICATION OF DATA READ IN MEMORY

CROSS REFERENCE TO RELATED APPLICATIONS

This application is a national stage of International patent application number PCT/FR2008/052073, filed on Nov. 18, 2008, entitled "Verification Of Data Read In Memory" which application claims priority to French application number 07/59136, filed Nov. 19, 2007, entitled "Verification Of Data Read In Memory" which applications are hereby incorporated by reference to the maximum extent allowable by law.

BACKGROUND OF THE INVENTION

1. Field of the Invention

The present invention generally relates to electronic circuits and, more specifically, to circuits containing a digital data processing unit capable of processing data contained in one or several memories internal or external to the circuit.

The present invention more specifically applies to the checking of the integrity (the absence of modification) of data transferred between a memory and a processing unit.

2. Discussion of the Related Art

In many applications, it is desirable to ensure that data transferred between a memory and a processing unit are not modified either on transfer thereof over communication buses, or on buffering thereof between their source memory and the processing unit. Such modifications may be incidental or voluntary. A voluntary modification results, for example, from a so-called fault-injection attack which comprises introducing a disturbance in the electronic circuit operation (for example, by intervening on its power supply) to modify the data states on the transfer buses or in the memories. Such fault injections may, for example, modify the running of a program, modify data accessed by this program, etc. and may result, for example, in accepting an erroneous authentication, introducing a parasitic program (virus), hacking a key or a cryptography algorithm, etc.

To block such attacks, hardware solutions include physically detecting the original disturbance (light, heat, supply current, etc.) or performing redundant calculations. Such hardware solutions are costly in terms of integrated circuit surface area.

Software solutions which comprise, for example, checking that the program has effectively gone through certain steps, reading data several times in a row and comparing them with one another. All these solutions have a cost in terms of performance and especially in terms of program execution speed.

An incidental modification of the progress of a program may originate from a noisy environment (for example, a microcontroller in an industrial environment or in a vehicle) and translate as unwanted malfunctions.

SUMMARY OF THE INVENTION

It would be desirable to overcome all or part of the disadvantages of known solutions for controlling the integrity of data read from a circuit external to a processing unit, be it or not integrated with this unit.

According to one aspect, the solution is applicable to a memory integrated in the same circuit as the processing unit.

According to another aspect, the solution is efficient against fault-injection attacks.

According to another aspect, the circuit performance is not impaired by the performed checking.

According to another aspect, the solution is transparent for the program running on the processing unit.

An embodiment provides a method for checking data transferred between a circuit and a processing unit, in which:

the data originating from the circuit transit through a first buffer element having a size which is a multiple of the size of data to be subsequently delivered over a bus of the processing unit;

an address provided by the processing unit for the circuit is buffered in a second element; and the content of the first element is compared with current data originating from the circuit, at least when they correspond to an address of data already present in this first element.

According to an embodiment, all the data delivered over the bus of the processing unit and contained in the first element are compared with the current data extracted from the peripheral element based on the address stored in the second element.

According to an embodiment, when a current address is delivered by the processing unit, it is compared with the address contained in the second element and, in case of an identity between the two addresses, the data contained in the first element are provided to the bus of the processing unit.

According to an embodiment, in case of a lack of identity between the address provided by the processing unit and that contained in the second element, the current address is stored in the second element and the content of the first element is replaced with the data provided by the circuit based on the current address, in parallel with the provision of a portion of said data to the processing unit.

There is also provided a method for detecting a fault injection in an electronic circuit, in which data transferred between a memory and a processing unit of the circuit are checked by the implementation of the checking method, a lack of identity between the content of the first element and the current data triggering an exception processing.

According to another embodiment, there is also provided an electronic circuit comprising at least one processing unit, and comprising an interface circuit between address and data buses of the processing unit and address and data buses intended for at least one circuit peripheral to this unit, said interface circuit comprising:

at least one first buffer element having a size which is a multiple of that of data transiting over the data bus of the processing unit;

a second buffer element for storing an address provided by the processing unit for the peripheral circuit; and means for implementing the method for checking data transferred between the peripheral circuit and the processing unit.

According to another embodiment, the peripheral circuit is a memory.

The foregoing and other objects, features, and advantages of the present invention will be discussed in detail in the following non-limiting description of specific embodiments in connection with the accompanying drawings.

DETAILED DESCRIPTION

Figure 1:
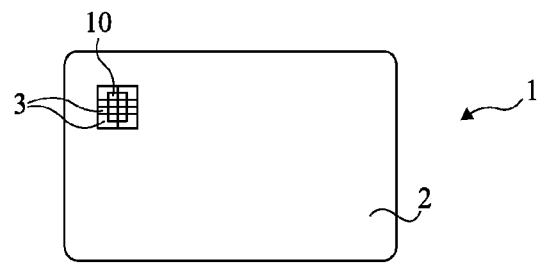
FIG. 1 shows a smart card of the type to which the present invention applies as an example.

The same elements have been designated with the same reference characters in the different drawings.

For clarity, only those steps and elements which are useful to the understanding of the present invention have been shown and will be described. In particular, the main functions of the processing units and of the programs processed by these units have not been discussed, as embodiments of the present invention are compatible with any electronic circuit provided with a processing unit. Similarly, the nature of the checked data has not been detailed, as embodiments of the present invention are here again compatible with any type of data, be they instructions (opcodes, operands or arguments) or variables. Further, embodiments of the present invention will be more specifically described in relation with an example of application to the protection of data against possible attacks by fault injection in a circuit integrating the processing unit and the memories from which the data are read, but it more generally applies to any incidental malfunction. In particular, for a microcontroller operation in a noisy environment, embodiments of the present invention are also advantageous if the memories are external to the circuit integrating the processing unit.

FIG. 1 very schematically shows a smart card 1 of the type to which the present invention applies as an example. Such a card is for example formed of a support 2 of plastic matter in or on which is placed an electronic circuit chip 10 capable of communicating with the outside by means of contacts 3 or at least of contactless transceiver elements (not shown). Circuit 10 of the card contains a processing unit capable of executing programs stored in memories generally contained in circuit 10 or in other circuit supported by the card.

Figure 2:
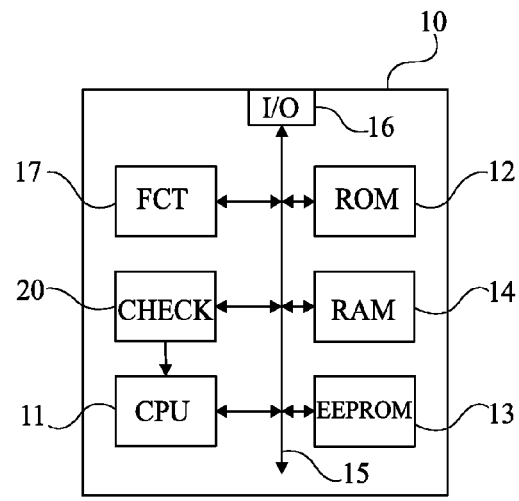
FIG. 2 is a block diagram of an example of electronic circuit architecture of the type to which the present invention applies as an example.

FIG. 2 is a block diagram of an embodiment of an electronic circuit 10. This circuit comprises a central processing unit 11 (CPU) capable of executing programs contained in one or several memories. In this example, circuit 10 comprises a non-reprogrammable non-volatile memory 12 (ROM), a reprogrammable non-volatile memory 13 (EEPROM), and a RAM 14. One or several data, address, and control buses 15 are used as a support for the communication between the different components of circuit 10 and with an input/output interface 16 (I/O) for communicating with or without contact with the outside. Most often, circuit 10 comprises other functions (block 17, FCT) depending on the application. These are, for example, dedicated cryptographic calculation cells for implementing ciphering and deciphering algorithms.

In the embodiment shown in FIG. 2, circuit 10 further comprises a circuit 20 (CHECK) of interface between the central processing unit and the memories to check for the absence of data modifications between several read operations in the memory. In the shown example, circuit 20 is interposed between bus 15 and unit 11 so that it checks the data read from all the memories. As a variation, the processing may concern part only of the memories.

Figure 3:
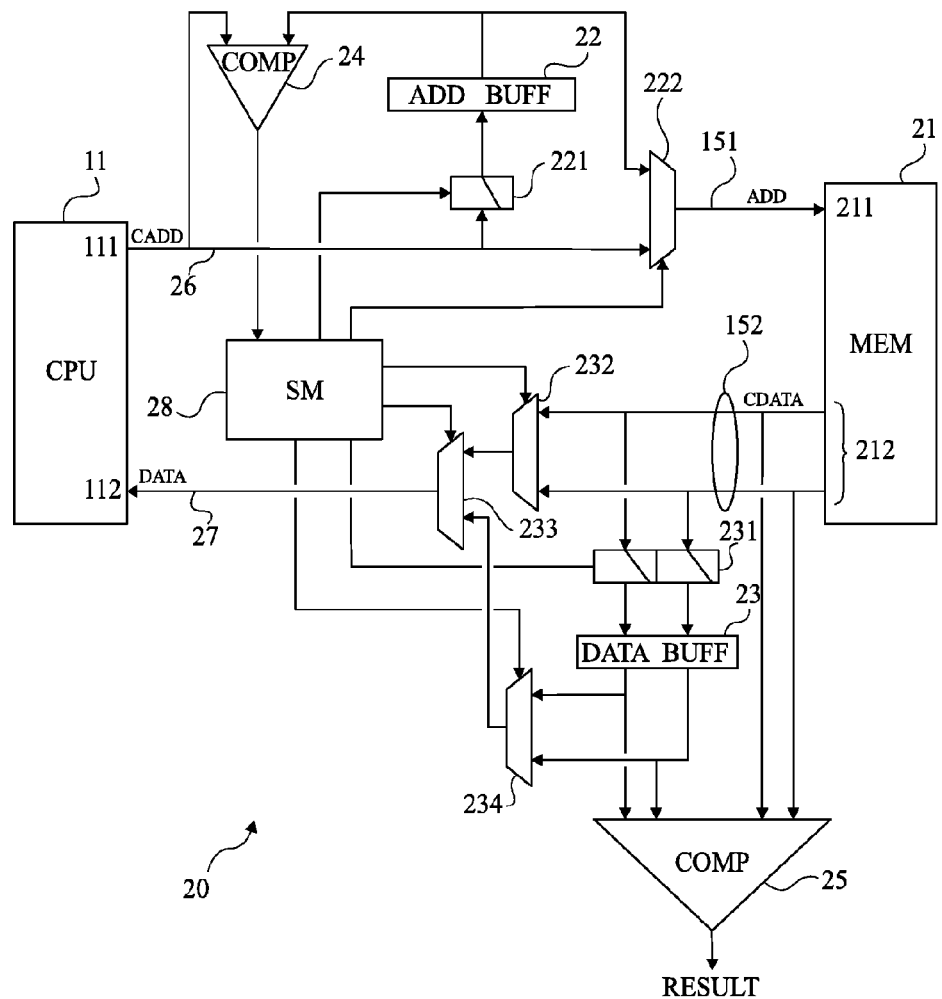
FIG. 3 is a functional block diagram of an embodiment of an interface between a processing unit and a memory.

FIG. 3 is a functional block diagram of an embodiment of an interface 20 for controlling the data transferred between a memory 21 (MEM) and processing unit 11 (CPU). Memory 21 for example is one of memories 12, 13, or 14 of circuit 10 of FIG. 2. More generally, memory 21 may be formed by any data storage circuit, integrated or not between the processing unit (for example, a buffer of a peripheral circuit integrated to the processing unit, a mass storage external to the circuit integrating the processing unit, etc.).

Circuit 20 comprises a storage element 22 (ADD BUFF) for buffering the addresses provided by processing unit 11. Element 22 samples, for example, under control of a block 221 of switches, an address from an address bus 26 of processing unit 11. A selector 222 is interposed between bus 26 and an input 211 of address bus 151 of memory 21. Circuit 20 also comprises an element 23 (DATA BUFF) for buffering the data extracted from memory 21. Element 23 samples, for example, under control of a block 231 of switches, the data delivered on output 212 of data bus 152 of memory 21. As a variation to switches 221 and 231, the same function of loading on request addresses and data into respective elements 22 and 23 (for example, registers) may be obtained by masking or not the clock edges which control the copying of the bits into flip-flops forming elements 22 and 23.

According to this embodiment, element 23 has a size corresponding to the size of the data in the memory and to twice the size of the data exploited by processing unit 11. In other words, the read granularity of memory 21 (the size of its words) is twice as large as the size of data bus 27 of processing unit 11. For example, element 23 is a 16-bit register for an 8-bit processing unit or a 32-bit register for a 16-bit unit, etc. Accordingly, data bus 152 between memory 21 and circuit 20 is twice as large as data bus 27 between processing unit 11 and circuit 20. A first selector 232 receives bus 152 and selects half of the data. A second selector 233 receives the output of selector 232 and the output of a third selector 234 separating the content of element 23 in two. Selector 233 provides a data word (a half memory word) on bus 27.

Preferably, elements 22 and 23 are physically placed as close as possible to accesses 111 and 112 of unit 11.

Circuit 20 further comprises two comparators 24 and 25 (COMP), respectively of the address provided by the processing unit with respect to the address contained in element 22, and of the data present on bus 152 with respect to that contained in element 23.

A state machine 28 (SM) controls selectors 222, 232, 233, and 234 according to the result provided by comparator 24, as well as blocks 221, 231, and thus the writing into registers 22 and 23. Comparator 25 provides a result, for example, to unit 11 or another system element, to enable it to take any appropriate action in case a modification of the data is detected.

Functionally, the data checking by comparator 25 is performed after a reading from element 23 by comparing at once the entire content of element 23 with that present on bus 152.

Advantage is taken from the fact that, in most cases, words read from the memories in one cycle have a size greater than words to be introduced per cycle into the processing unit. This especially enables performing the data checking as a background task in memory interface 20.

Advantage is also taken from the fact that, in most cases, the loading of the data (programs, constants, variables, etc.) between a memory and a processing unit is performed on consecutive addresses. Accordingly, in most cases, the second portion of the background-checked data contains, in the second portion, that which is effectively requested by the processing unit at the next cycle.

Figure 4:
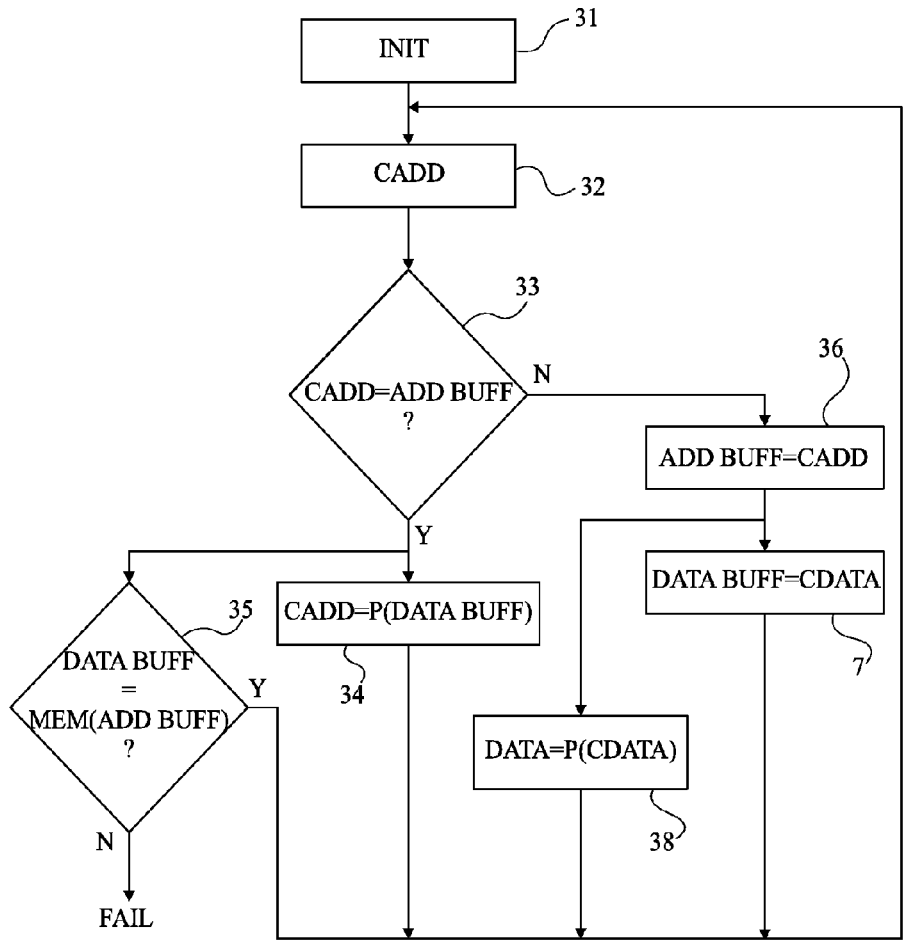
FIG. 4 is a timing diagram illustrating an embodiment of a method for checking the integrity of the read data.

FIG. 4 illustrates an embodiment of the checking method in the form of a flowchart. This flowchart corresponds to the processing performed by circuit 20 of FIG. 3.

Registers 22 and 23 are initialized (block 31, INIT), for example, on activation of circuit 20, or on reset of processing unit 11. The initialization comprises emptying (address 0) address register 22 or storing into it an arbitrary address, and placing, in data register 23, the data contained in the memory at the address carried by register 22.

After, each time the processing unit calls (block 32, CADD) data from memory 21 by provision of an address over its bus 111, the following checking process is implemented.

It is started (block 33, CADD=ADD BUFF?) by comparing the content of address register 22 with current address CADD provided by processing unit 11. In case of an identity between the two addresses (output Y of block 33), this means that the corresponding data are already present in data register 23. For example, such is the case where it is the second called byte of a 16-bit word read from the memory while the preceding step performed by the processing unit would be to read the first byte of this 16-bit word. The corresponding byte P(DATA BUFF) of register 23 is then provided (block 34) over bus 27 to the processing unit as DATA.

In the same cycle, the content of data register 23 is compared with the current data delivered by memory 21 over bus 152 (block 35, DATA BUFF=MEM(ADD BUFF)?) after the address provided by address register 22. This comparison enables checking that the data which have been provided to processing unit 11 and which were already present in register 23 in a previous read cycle have not been modified with respect to the current cycle. It is thus effectively a checking of the integrity of the data extracted from memory 21 and a checking of the absence of fault injection disturbance. In case of an incoherence between the data (output N of block 35), this triggers an exception processing FAIL. Such a processing comprises, for example, a blocking of electronic circuit 10 or any other countermeasures adapted to a fault injection. In case of a validated integrity of the data (output Y of block 35), the process carries on normally and, from the viewpoint of interface 20, this means waiting again for a new address CADD (block 32) called by processing unit 11.

In the case where the current address is not identical to that contained in register 22 (output N of block 33), this means that data must be reloaded into register 23. The content of address register 22 is then replaced with current address CADD provided by the processing unit (block 36, ADD BUFF=CADD). Then, the content of data register 23 is loaded by the current data provided by memory 21 (DATA BUFF=CDATA). In parallel, the memory interface provides processing unit 11 with one of the two words extracted from memory 21 (block 38, DATA=P(CDATA)).

To implement the above embodiments, a buffer element 23 having a size corresponding to twice the size of the data bus of the concerned processing unit is used. Any other factor may be provided.

An advantage is that the interface operation is transparent for the program executed by unit 11 and takes no time away from the execution thereof.

Another advantage is that the described mechanism is particularly effective against fault-injection attacks.

Another advantage is that the hardware cost of the implementation is of a few additional logic elements only in the memory interface.

The fact for the data to be provided to the processing unit despite the checking (blocks 34 and 38 in parallel with checking 35) is in practice not disturbing. Indeed, even if the error is only detected a few cycles after the data have been used by the processing unit, the unit will have in practice not had the time to endanger the system security.

Specific embodiments of the present invention have been described. Various alterations and modifications will occur to those skilled in the art. In particular, the practical implementation of the present invention is within the abilities of those skilled in the art based on the functional indications given hereabove, especially as to the synchronization of the exchanges between processing unit 11 and interface 20 and the interpretation, by processing unit 11, of the performed comparisons.

Further, although embodiments of the present invention have been described in relation with a memory integrated to the electronic circuit, it more generally applies to a checking of data delivered at the input of a processing unit, whether these data originate from a memory or from any other circuit (for example, any peripheral) since the data are then, even in this peripheral, generally contained in a memory.

Moreover, the addresses provided by unit 11 may undergo various conversions (for example, from a virtual address to a physical address) without for this to modify the operation, provided for the two compared addresses (comparator 24 or block 33) to be both taken either before or after conversion. Similarly, the data may undergo various processings between memory 21 and unit 11 (for example, a deciphering), provided for the two compared data (comparator 25 or block 35) to be coherent with each other.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for checking data transferred between a circuit and a processing unit, wherein:
   the data originating from the circuit transit through a first buffer element having a size which is a multiple of the size of data to be subsequently delivered over a bus of the processing unit;
   an address provided by the processing unit in a previous read cycle is temporarily stored in a second buffer element;
   an address provided by the processing unit in a current read cycle is compared with the address stored in the second buffer element; and
   the data of the first buffer element, read from the circuit in the previous read cycle, is compared with current data, read from the circuit in the current read cycle, when the address provided by the processing unit matches the address stored in the second buffer element, wherein a lack of coherence between the current data and the data of the first buffer element indicates a lack of integrity of the current data.

2. The method of claim 1, wherein all the data delivered over the bus of the processing unit and contained in the first buffer element are compared with the current data extracted from the circuit based on the address stored in the second buffer element.

3. The method of claim 1, wherein when a current address is delivered by the processing unit, it is compared with the address contained in the second buffer element and, in case of an identity between the two addresses, the data contained in the first buffer element are provided to the bus of the processing unit.

4. The method of claim 3, wherein in case of a lack of identity between the address provided by the processing unit and that contained in the second buffer element, the current address is stored in the second buffer element and the content of the first buffer element is replaced with the data provided by the circuit based on the current address, in parallel with the provision of part of said data to the processing unit.

5. A method for detecting a fault injection in an electronic circuit, wherein data transferred between a memory and a processing unit of the circuit are checked by the implementation of the checking method of claim 1, a lack of identity between the data of the first buffer element and the current data triggering an exception processing.

6. An electronic circuit comprising at least one processing unit, comprising an interface circuit between address and data buses of the processing unit and address and data buses intended for at least one circuit peripheral to the at least one processing unit, said interface circuit comprising:
   at least one first buffer element having a size which is a multiple of that of data transiting over the data bus of the processing unit;
   a second buffer element for storing an address provided by the processing unit for the peripheral circuit; and
   a circuit configured to implement the method of claim 1.

7. The circuit of claim 6, wherein the peripheral circuit is a memory.

8. A method for checking data transferred between a peripheral unit and a processing unit, comprising:
   storing, in an address buffer, an address provided by the processing unit in a previous read cycle;
   storing, in a data buffer, data read from the peripheral unit in the previous read cycle;
   comparing a current address, provided from the processing unit in a current read cycle, with the address in the address buffer;
   when the current address and the address in the address buffer are equal, comparing current data read from the peripheral unit in the current read cycle and the data, stored in the data buffer, that was read from the peripheral unit in the previous read cycle; and
   when the current data and the data in the data buffer are not equal, indicating a lack of integrity of the current data.

9. A method as defined in claim 8, further comprising, when the current address and the address in the data buffer are not equal, storing the current address in the address buffer and storing the current data in the data buffer.

10. A method as defined in claim 8, wherein the data buffer has a data size that is a multiple of a data size of data provided to the processing unit.

11. A method as defined in claim 8, wherein the data buffer has a size that is twice a data size of data provided to the processing unit.

12. A method as defined in claim 8, wherein the peripheral unit comprises a data storage circuit.

13. A method as defined in claim 10, wherein the data stored in the data buffer is compared with the current data read from the peripheral unit based on the address stored in the address buffer.

14. A method as defined in claim 8, wherein a current address supplied by the processing unit is compared with the address stored in the address buffer and, when the two addresses are equal, the data stored in the data buffer is provided to the processing unit.

15. A method as defined in claim 8, further comprising triggering exception processing in response to an indication of lack of integrity of the current data.

16. An electronic circuit comprising:
   a processing unit; and
   an interface circuit configured to check data transferred between a peripheral unit and the processing unit, the interface circuit comprising;
      an address buffer configured to store an address provided by the processing unit in a previous read cycle;
      a data buffer configured to store data read from the peripheral unit in the previous read cycle; and
      a control circuit configured to compare a current address, provided from the processing unit in a current read cycle, with the address in the address buffer, to compare current data read from the peripheral unit and the data, stored in the data buffer, that was read from the peripheral unit in the previous read cycle, when the current address and the address in the address buffer are equal, and to indicate a lack of integrity of the current data when the current data and the data in the data buffer are not equal.

17. An electronic circuit as defined in claim 16, wherein the control circuit is further configured to store the current address in the address buffer and to store the current data in the data buffer when the current address and the address in the data buffer are not equal.

18. An electronic circuit as defined in claim 16, wherein the data buffer has a data size that is a multiple of a data size of data provided to the processing unit.

19. An electronic circuit as defined in claim 18, wherein the control circuit includes an address comparator configured to compare the current address from the processing unit with the address in the address buffer and a data comparator configured to compare current data read from the peripheral unit and the data in the data buffer.

20. An electronic circuit as defined in claim 16, wherein the peripheral unit comprises a memory.

* * * * *

UNITED STATES PATENT AND TRADEMARK OFFICE
CERTIFICATE OF CORRECTION

PATENT NO. : 8,775,697 B2
APPLICATION NO. : 12/743684
DATED : July 8, 2014
INVENTOR(S) : Fabrice Romain et al.

It is certified that error appears in the above-identified patent and that said Letters Patent is hereby corrected as shown below:

In the Specification:

In column 1, line 42, "include" should read --including--.

Signed and Sealed this
Seventh Day of October, 2014

Michelle K. Lee
*Deputy Director of the United States Patent and Trademark Office*